United States Patent [19]

Stowell et al.

[11] Patent Number: 5,419,454

[45] Date of Patent: May 30, 1995

[54] MIXING BOWL

[75] Inventors: Davin Stowell, New York, N.Y.;
Stephan C. Allendorf, Hoboken, N.J.

[73] Assignee: General Housewares Corp., Terre Haute, Ind.

[21] Appl. No.: 215,150

[22] Filed: Mar. 21, 1994

[51] Int. Cl.$^6$ ............................................. B65D 21/00
[52] U.S. Cl. ..................................... 220/574; 220/755
[58] Field of Search ............... 220/625, 626, 632, 636, 220/574, 574.1, 575, 771, 755

[56] References Cited

U.S. PATENT DOCUMENTS

| | | |
|---|---|---|
| 100,374 | 3/1870 | Carleton . |
| D. 193,104 | 6/1962 | Fisher . |
| D. 277,251 | 1/1985 | Gulotta . |
| 282,244 | 7/1883 | Vernon . |
| 517,789 | 4/1894 | Buckley . |
| 1,227,356 | 5/1917 | Yaroscak ........................ 220/626 X |
| 1,864,200 | 6/1932 | Kaufmann ........................... 220/632 |
| 1,985,558 | 12/1934 | Alexander ........................ 220/632 |
| 2,121,165 | 6/1938 | Slobodkin ........................ 220/574 |
| 2,131,278 | 9/1938 | Gough .......................... 220/755 X |
| 2,479,765 | 8/1949 | Mower . |
| 2,548,035 | 4/1951 | May . |
| 3,110,303 | 11/1963 | Brownrigg . |
| 3,252,612 | 5/1966 | Von Myhre ..................... 220/632 X |
| 3,894,591 | 7/1975 | Ackeret . |
| 4,573,603 | 3/1986 | Starling et al. .................. 220/632 X |
| 4,646,717 | 3/1987 | Baggioli .......................... 220/771 X |
| 5,046,633 | 9/1991 | Chung . |
| 5,169,023 | 12/1992 | Heiberg et al. . |
| 5,201,264 | 4/1993 | Thelen et al. . |
| 5,203,836 | 4/1993 | Brazis et al. . |

*Primary Examiner*—Steven M. Pollard
*Attorney, Agent, or Firm*—Emrich & Dithmar

[57] ABSTRACT

A mixing bowl has a unitary inner shell including a circular base and a peripheral side wall extending upwardly therefrom to an upper peripheral rim defining the open mouth of the bowl, the side wall having a spout at one side thereof and, diametrically opposite thereto, a laterally outwardly extending two-part handle, including an upper part unitary with the inner shell of the bowl and a lower part fixed thereto. The handle has a compound upper surface and a recessed lower surface to facilitate grasping. The base and the lower portion of the peripheral side wall have the outer surfaces thereof covered with an outer shell of frictional material.

19 Claims, 3 Drawing Sheets

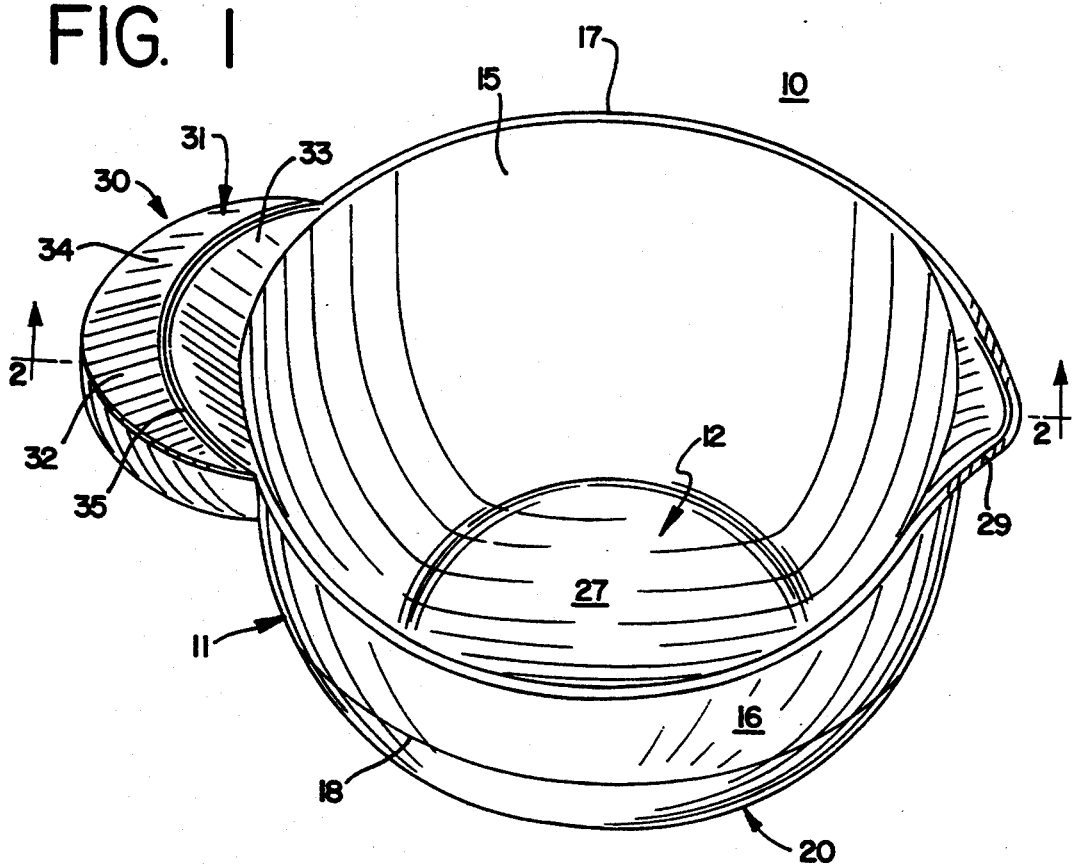
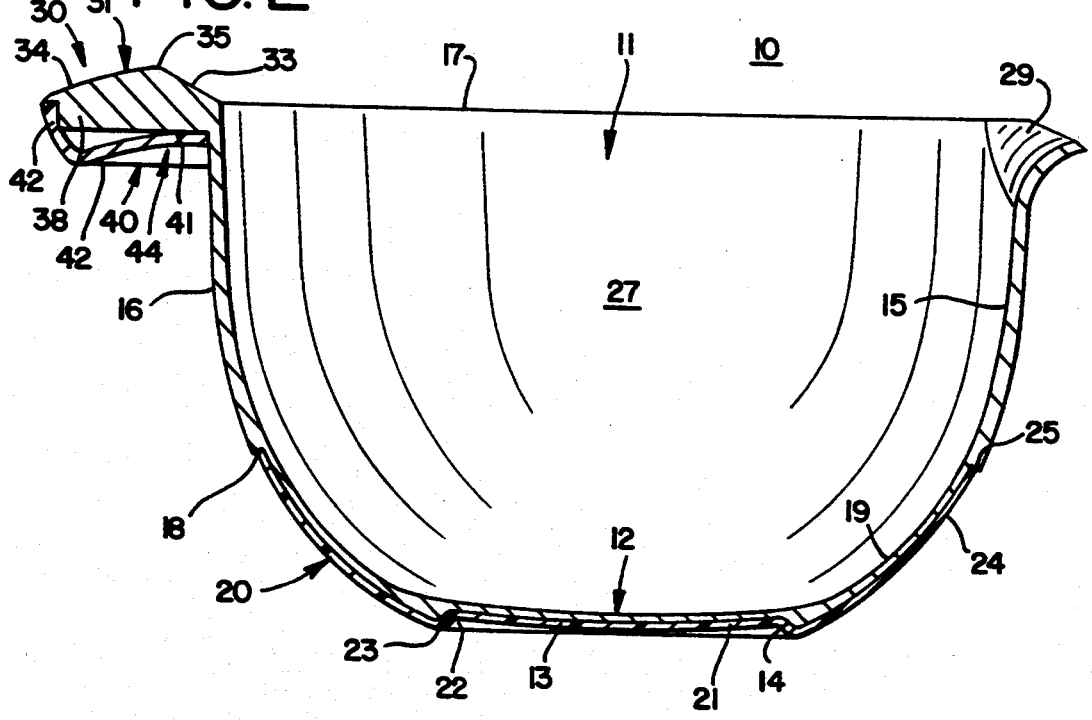

5,419,454

MIXING BOWL

BACKGROUND OF THE INVENTION

1. Field of the Invention

The present invention relates generally to bowls of the type used in kitchen environments for the preparation of food and, specifically, to mixing bowls.

2. Description of the Prior Art

Mixing bowls typically comprise a circular base and a peripheral wall extending arcuately upwardly and outwardly relative to the base to an upper peripheral rim, which defines an open top or mouth of the bowl. The bowl, both interiorly and exteriorly, is typically of a generally hemispherical configuration which facilitates the blending or mixing of the contents within the bowl and permits manual inclining or tilting of the bowl for facilitating the introduction and use of implements, such as beaters, stirrers or the like, for mixing the contents.

A problem with conventional mixing bowls is that, when they are held by one hand of a user and tilted for mixing purposes, and particularly when subjected to a substantial agitation or mixing of the contents, there is a tendency of the bowl to skid or slide along the underlying support surface, such as a table, counter or the like. This can result in spillage of the contents.

Another difficulty with conventional mixing bowls is that they require the user, when grasping the bowl for purposes of holding it or tilting it, to place his or her thumb inside the bowl where it may come in contact with the contents. It is known to provide a bowl with a lip or flange around the perimeter of the rim so that the fingers of the user can be hooked therebeneath, but this still generally requires the user's thumb to be inserted inside the bowl to ensure firm grasping. It is also known to provide a vertical handle, akin to a teacup handle, projecting laterally from the outer surface of the peripheral side wall of the bowl. Such an arrangement is disclosed in U.S. Pat. No. 2,479,765. But this arrangement requires grasping of the bowl in an unorthodox manner and does not readily lend itself to easy rotation of the bowl about its axis.

SUMMARY OF THE INVENTION

It is a general object of the invention to provide an improved mixing bowl which avoids the disadvantages of prior constructions while affording additional structural and operating advantages.

An important feature of the invention is the provision of a mixing bowl which resists skidding or sliding along underlying support surfaces.

In connection with the foregoing feature, another feature of the invention is the provision of a mixing bowl which has a rigid inner shell and an outer shell of a material having a relatively high coefficient of friction.

Still another feature of the invention is the provision of a mixing bowl of the type set forth which does not require that a user's thumb or fingers be inserted inside the bowl in use.

In connection with the foregoing feature, another feature of the invention is the provision of a mixing bowl of the type set forth which provides a uniquely-shaped handle to facilitate efficient grasping thereof.

These and other features of the invention are attained by providing a mixing bowl comprising an inner shell including a base and a peripheral side wall each having an inner surface and an outer surface, the side wall extending upwardly from the base around the entire perimeter thereof to an upper peripheral rim defining an open mouth for the bowl, the outer surface of the peripheral side wall having an annular shoulder intermediate the base and the rim defining a lower portion of the side wall extending from the base around the entire perimeter thereof to the shoulder, and an outer shell covering the outer surfaces of the base and the lower portion of the side wall and formed of a non-slip material having a coefficient of friction substantially greater than that of the inner shell, the outer shell being fixed to the inner shell and abutting the shoulder.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a top perspective view of a mixing bowl constructed in accordance and embodying the features of the present invention;

FIG. 2 is an enlarged view in vertical section taken along the line 2—2 in FIG. 1;

DESCRIPTION OF THE PREFERRED EMBODIMENT

Figure 3:
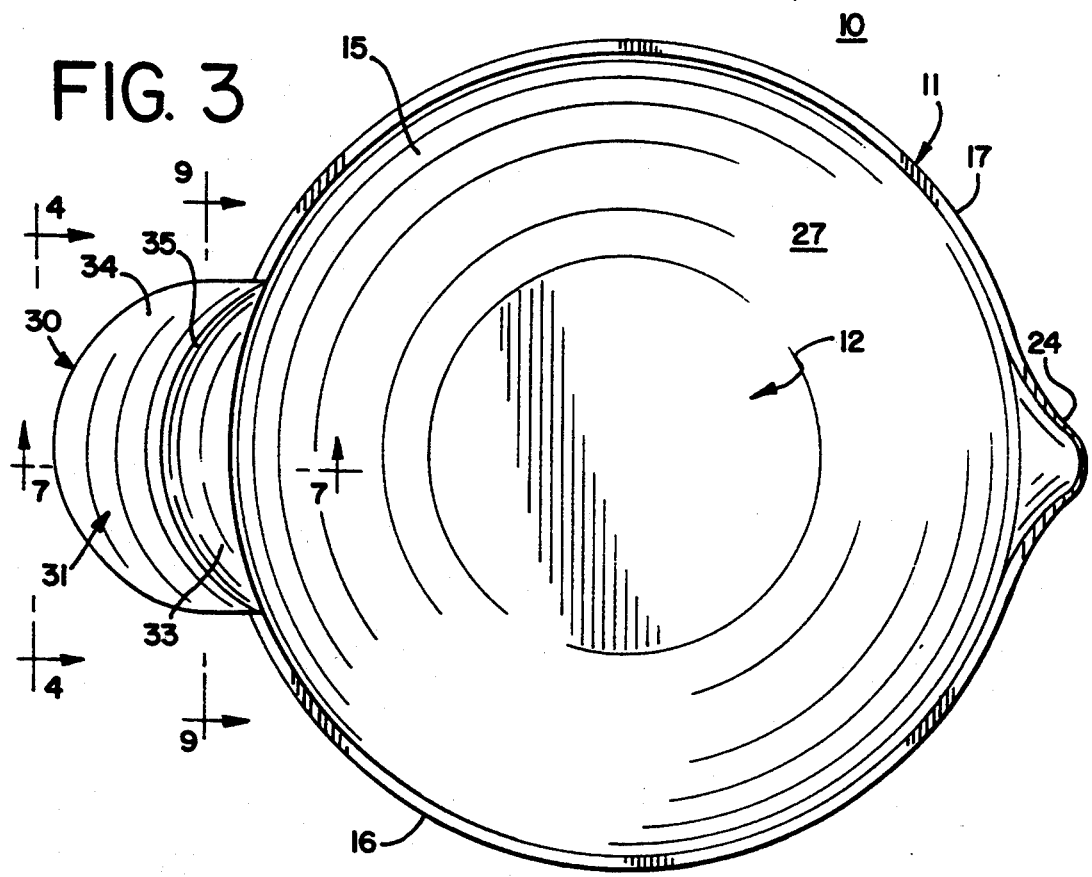
FIG. 3 is a top plan view of the mixing bowl of FIG. 2.
Figure 4:
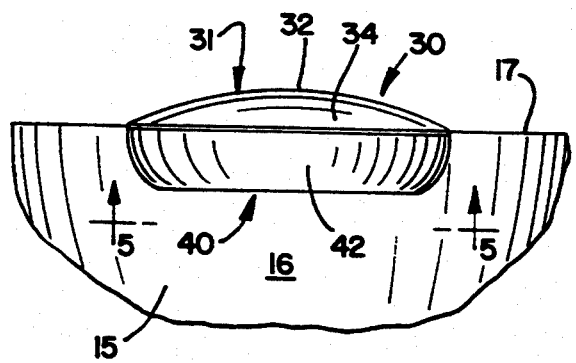
FIG. 4 is a fragmentary side elevational view taken along the line 4—4 in FIG. 3.

Referring to FIGS. 1-3, there is illustrated a bowl, generally designated by the numeral 10, constructed in accordance with the present invention. The bowl 10 includes an inner shell 11 of unitary, one-piece construction, formed of a hard, relatively incompressible material, such as a suitable plastic, and having a circular base 12. The base 12 has an outer surface 13 which defines a shallow circular recess 14 in the base 12. Extending laterally outwardly and upwardly from the base 12 around the circumference thereof is a peripheral side wall 15 which has an outer surface 16 and terminates in a substantially circular rim 17 at the upper edge thereof. Formed in the outer surface 16 is an annular, radially inwardly extending shoulder 18 which defines the upper edge of a recessed lower portion 19 of the side wall 15. Preferably, the shoulder 18 is disposed below the midpoint of the vertical distance between the base 12 and the rim 17.

The bowl 10 is also provided with an outer shell 20 of unitary, one-piece construction, and preferably formed of a relatively soft and incompressible material having a coefficient of friction much higher than that of the inner shell 11. The outer shell 20 is generally bowl-shaped and covers the outer surface of the lower portion 19 of the inner shell 11. More specifically, referring to FIG. 2, the outer shell 20 has a base portion 21 which lies in the recess 14 of the base 12 and covers the outer surface thereof and, in turn, defines a recess 22 in the outer shell 20 which, at the periphery thereof, defines a circular contact ridge or seat 23. Extending laterally outwardly and upwardly from the base portion 21 is a peripheral portion 24 which covers the outer surface of the lower portion 19 of the inner shell 11 and terminates in a circular upper edge or lip 25, which abuts the shoulder 18 of the inner shell 11. The outer shell 20 is fixedly secured to the outer surface of the inner shell 11 by any suitable means. In a constructional model of the invention, the outer shell 20 is formed of a soft rubber-type material, such as that sold under the trade name SANTOPRENE.

The inner shell 11 has an arcuately concave, smooth, continuous, inner surface 27 to facilitate mixing of contents therein. The peripheral side wall 15 is provided at the upper edge thereof with a pouring spout 29.

Referring now also to FIGS. 4–9, the bowl 10 is also provided with a handle 30 which is disposed at the upper end of the peripheral side wall 15 diametrically opposite the pouring spout 29. The handle 30 is of two-part construction, having an upper section 31, which is unitary with the inner shell 11, and a lower section 40, the sections 31 and 40 having fixedly secured together in use. The upper section 31 has a generally crescent-shaped top wall 32, which has laterally inner and outer portions 33 and 34, each of which is slightly convex. The inner and outer portions 33 and 34 intersect along an arcuate raised ridge 35, so that the inner portion 33 slopes laterally downwardly and inwardly toward the peripheral side wall 15, while the outer portion 34 slopes laterally downwardly and outwardly away from the peripheral side wall 15. The peripheral edges of the inner and outer portions 33 and 34 are substantially coplanar with each other and with the rim 17 of the inner shell 11, while the ridge 35, at its midpoint, is spaced well above the rim 17 and slopes downwardly to end points which intersect the rim 17.

Figure 6:
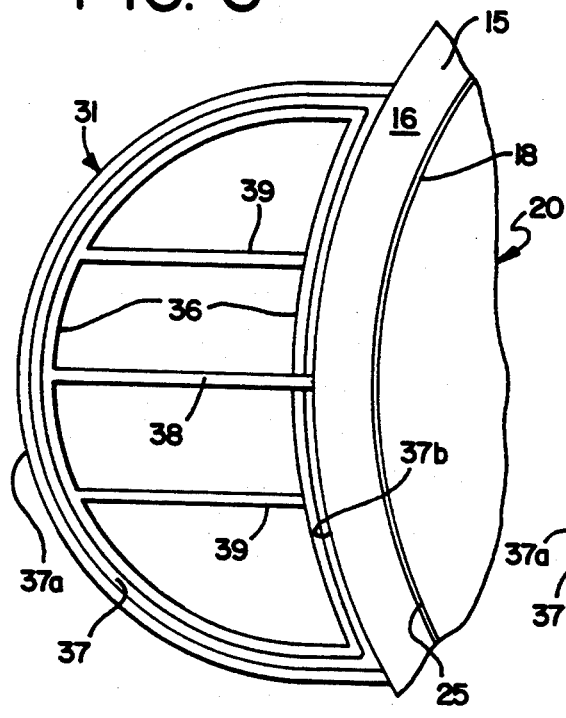
FIG. 6 is an enlarged, bottom plan view of the upper section of the handle of the bowl of FIG. 2, with the bottom section of the handle removed.
Figure 7:
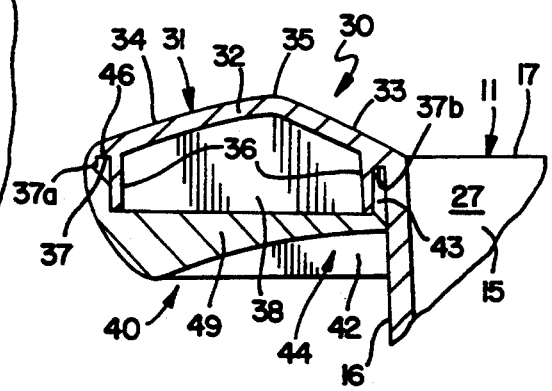
FIG. 7 is an enlarged, fragmentary view in vertical section taken along the line 7—7 in FIG. 3.
Figure 9:
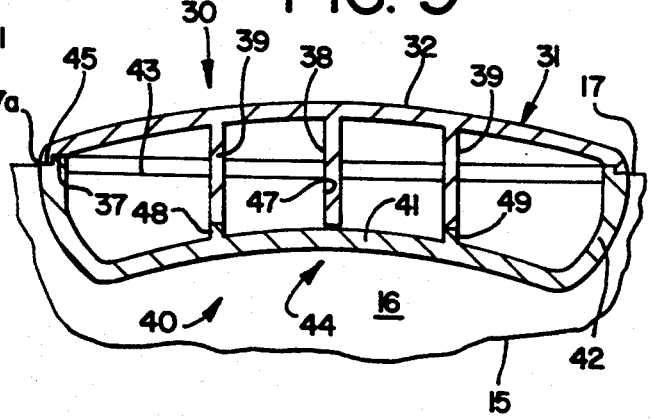
FIG. 9 is an enlarged, fragmentary view in vertical section taken along the line 9—9 in FIG. 3.

Depending from the top wall 32 around the entire perimeter thereof a slight distance inwardly from the periphery thereof is a peripheral flange 36 (FIGS. 6 and 7). Formed in the underside of the top wall 32 just outside the flange 36 around the entire perimeter thereof is a groove 37 which defines a lip 37a and which, at the peripheral edge of the inner portion 33, adjacent to the inner shell peripheral side wall 15, forms an arcuate slot 37b. Depending from the top wall 32 in the vertical midplane thereof is a center rib 38 which extends from the outer portion of the peripheral flange 36 to the peripheral side wall 15 of the inner shell 11, crossing the slot 37b (FIGS. 6, 7 and 9). Also depending from the top wall 32 and spanning the depending peripheral flange 36, equidistantly spaced from the center rib 38 on opposite sides thereof and substantially parallel thereto, are two side ribs 39 (FIGS. 6 and 9). The bottom edges of the peripheral flange 36 and the ribs 38 and 39 are substantially coplanar.

Figure 5:
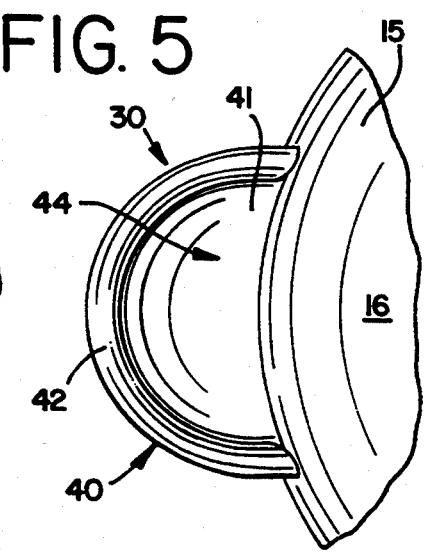
FIG. 5 is a fragmentary bottom plan view of the handle of the mixing bowl illustrated in FIG. 4, taken along the line 5—5 therein.
Figure 8:
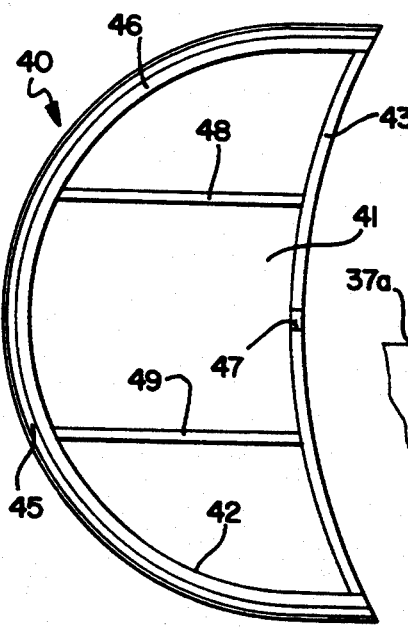
FIG. 8 is an enlarged top plan view of the lower section of the handle of the bowl of FIG. 2, with the upper section of the handle removed.

The lower section 40 of the handle 30 has substantially the same outline shape as the upper section 31 and includes a generally concave base wall 41 (FIGS. 2, 5 and 9). The base wall 41 is unitary around its outer periphery with a convex, arcuate outer side wall 42 and, along its inner edge, with an arcuate side wall 43 which follows the contour of the peripheral side wall 15 of the inner shell 11 (FIGS. 7–9). The base wall 41 slopes upwardly and laterally inwardly from its outer edge to its inner edge so that, at its outer edge it is substantially coplanar with the bottom edge of the outer side wall 42 while, at its inner edge along the inner shell 11, it is substantially midway between the upper and lower edges of the outer side wall 42. Thus, the base wall 41 and the outer side wall 42 cooperate to define a shallow recess or cavity 44 beneath the handle 30. The inner side wall 43 extends upwardly from the inner edge of the base wall 41 and terminates at an upper edge a slight distance below the upper edge of the outer side wall 42 (FIGS. 7 and 9). The upper edge of the outer side wall 42 has a peripheral recess 45 formed therein which defines an upstanding lip 46. The inner side wall 43 has a narrow slot 47 formed in the upper edge thereof midway between the ends thereof (FIG. 8). The lower section 40 is also provided with a pair of stiffening ribs 48 and 49 which are upstanding from the base wall 41 substantially parallel with each other and extending between the outer and inner side walls 42 and 43 (FIGS. 7–9).

In assembly, the lower section 40 mates beneath the upper section 31, as can best be seen in FIGS. 2, 4, 7 and 9, with the lips 37a and 46, respectively, fitted in the recess 45 and the groove 37, and with the inner side wall 43 of the lower section 40 fitting in the slot 37b of the upper section 31. The depending peripheral flange 36 of the upper section 31 is disposed inside and abutting against the outer and inner side walls 42 and 43 of the lower section 40. The lower edges of the side ribs 39 on the upper section 31 abut the upper edges of the ribs 48 and 49 of the lower section 40. The lower end of the center rib 38 of the upper section 31 fits into the slot 47 in the inner side wall 43 of the lower section 40. The upper and lower sections 31 and 40 may be fixedly secured together by any suitable means, such as adhesive, ultrasonic welding or the like. When thus assembled, the ribs 38, 39, 48 and 49 cooperate to provide a stiffening structure for the handle 30.

In operation, the recess or cavity 44 beneath the handle 30 provides a location for receiving a user's fingers to facilitate grasping of the handle 30, with the user's thumb resting on top of the handle 30. Accordingly, it will be appreciated that the handle 30 provides a convenient means for grasping the bowl 10 with one hand without the need for the user's thumb to be inserted inside the bowl. Thus, the bowl 10 can be conveniently lifted or tilted with one hand, permitting use of the other hand for grasping a mixing or stirring tool or the like. The handle 30 is bi-laterally symmetrical so as to facilitate use by either right-handed or left-handed persons. Thus, it can be seen that the handle 30 has an ergonomic shape which facilitates easy grasping thereof and tilting of the bowl 10 in any direction with a single hand of the user. Also, the shape of the bowl 10 and the location of the handle 30 at its upper edge facilitate nesting thereof with other like bowls.

A significant aspect of the invention is that the frictional outer shell 20 inhibits sliding or skidding movement of the bowl 10 along an underlying table or other support surface during mixing operations. This is particularly advantageous when the bowl 10 is tilted.

From the foregoing it can be seen that there has been provided a bowl of simple and economical construction which has an ergonomic design facilitating one-handed lifting or tilting without inserting the user's thumb into the bowl, and which inhibits sliding or skidding on underlying surfaces.

I claim:

1. A mixing bowl comprising an inner shell including a base and a peripheral side wall each having an inner surface and an outer surface, said side wall extending upwardly from said base around the entire perimeter thereof to an upper peripheral rim defining an open mouth for the bowl, said outer surface of said peripheral side wall having an annular shoulder intermediate said base and said rim defining a lower portion of said side wall extending from said base around the entire perimeter thereof to said shoulder, and an outer shell covering the outer surfaces of said base and said lower portion of said side wall and formed of a non-slip material having a coefficient of friction substantially greater than that of said inner shell, said outer shell being fixed to said inner shell and abutting said shoulder.

2. The mixing bowl of claim 1, wherein said base has a recess formed in the outer surface thereof.

3. The mixing bowl of claim 1, wherein said base is circular in shape.

4. The mixing bowl of claim 3, wherein said base has a recess formed in the outer surface thereof, said outer shell having a base portion covering the recessed outer surface of said base and defining an annular support surface engageable with an associated underlying support surface when said mixing bowl rests upon said base.

5. The mixing bowl of claim 1, wherein said inner surfaces of said base and said peripheral side wall are smooth and continuous with each other.

6. The mixing bowl of claim 1, wherein said inner shell is formed of a relatively hard and incompressible material and said outer shell is formed of a relatively soft and compressible material.

7. The mixing bowl of claim 1, wherein said shoulder is disposed closer to said base than to said rim.

8. A mixing bowl comprising: a base, a peripheral side wall integral with said base around the entire perimeter thereof and extending upwardly therefrom to an upper peripheral rim defining an open mouth for the bowl, a handle of two-part construction including an upper part integral with said side wall adjacent to said rim and extending laterally outwardly therefrom in cantilever fashion and a lower part fixedly secured to said upper part, said handle extending circumferentially of said side wall an angular distance substantially less than 90°, said handle having a compound upper surface including an outer portion sloping downwardly and laterally away from said side wall and an inner portion sloping downwardly and laterally toward said side wall, said handle having a recessed lower surface defining a cavity to accommodate fingers of a user's hand.

9. The mixing bowl of claim 8, wherein said upper surface defines an arcuate ridge at the junction between said inner and outer portions.

10. The mixing bowl of claim 9, wherein said ridge is part-circular in shape and has end portions which intersect said peripheral side wall at said rim and a central portion which extends above said rim.

11. The mixing bowl of claim 8, wherein each of said inner and outer portions of said upper surface is generally convex.

12. The mixing bowl of claim 8, wherein said upper part is unitary with said peripheral side wall, said upper and lower parts having overlapping peripheral flanges.

13. The mixing bowl of claim 8, wherein said handle includes spaced-apart stiffening ribs extending substantially parallel to the direction of extension of said handle from said peripheral side wall.

14. The mixing bowl of claim 8, and further comprising a pouring spout formed on said peripheral side wall on the opposite side of said mouth from said handle.

15. A mixing bowl comprising an inner shell including a base and a peripheral side wall each having an inner surface and an outer surface, said side wall being integral with said base around the entire perimeter thereof and extending upwardly therefrom to an upper peripheral rim defining an open mouth for the bowl, said outer surface of said peripheral side wall having an annular shoulder intermediate said base and said rim defining a lower portion of said side wall extending from said base around the entire perimeter thereof to said shoulder, an outer shell covering the outer surfaces of said base and said lower portion of said side wall and formed of a non-slip material having a coefficient of friction substantially greater than that of said inner shell, said outer shell being fixed to said inner shell and abutting said shoulder, and a handle integral with said side wall adjacent to said rim and extending laterally outwardly therefrom in cantilever fashion, said handle having a compound upper surface including an outer portion sloping downwardly and laterally away from said side wall and an inner portion sloping downwardly and laterally toward said side wall, said handle having a recessed lower surface defining a cavity to accommodate fingers of a user's hand.

16. The mixing bowl of claim 15, wherein said inner shell is formed of a relatively hard and incompressible material and said outer shell is formed of a relatively soft and compressible material.

17. The mixing bowl of claim 15, wherein said upper surface defines an arcuate ridge at the junction between said inner and outer portions.

18. The mixing bowl of claim 15, wherein said handle is of two-part construction, including an upper part and a lower part fixedly secured to said upper part.

19. The mixing bowl of claim 15, wherein said upper part is unitary with said peripheral side wall, said upper and lower parts having overlapping peripheral flanges.

* * * * *

UNITED STATES PATENT AND TRADEMARK OFFICE
CERTIFICATE OF CORRECTION

PATENT NO. : 5,419,454
DATED : May 30, 1995
INVENTOR(S) : Davin Stowell et al.

It is certified that error appears in the above-indentified patent and that said Letters Patent is hereby corrected as shown below:

Column 6, line 58, "15" should be --18--.

Signed and Sealed this

Twenty-ninth Day of August, 1995

Attest:

BRUCE LEHMAN

Attesting Officer     Commissioner of Patents and Trademarks